United States Patent
Lee et al.

(10) Patent No.: US 11,905,993 B2
(45) Date of Patent: Feb. 20, 2024

(54) TURBOMACHINE HAVING HYBRID BEARING STRUCTURE INCLUDING MAGNETIC BEARING, PERMANENT MAGNET, AND SLEEVE JOURNAL BEARING AND METHOD OF CONTROLLING THE SAME

(71) Applicant: KOREA INSTITUTE OF SCIENCE AND TECHNOLOGY, Seoul (KR)

(72) Inventors: Yong Bok Lee, Seoul (KR); Jungwan Kim, Seoul (KR); Yunseok Ha, Seoul (KR); Byul An, Seoul (KR); Wonil Kwak, Seoul (KR); Yeong-do Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/956,246

(22) Filed: Sep. 29, 2022

(65) Prior Publication Data
US 2023/0407914 A1 Dec. 21, 2023

(30) Foreign Application Priority Data
Jun. 17, 2022 (KR) .................. 10-2022-0074059

(51) Int. Cl.
*F16C 32/04* (2006.01)
(52) U.S. Cl.
CPC ...... *F16C 32/0442* (2013.01); *F16C 32/0478* (2013.01); *F16C 2360/45* (2013.01)
(58) Field of Classification Search
CPC ............. F16C 32/0442; F16C 32/0478; F16C 2360/45
(Continued)

(56) References Cited

U.S. PATENT DOCUMENTS 5,220,232 A * 6/1993 Rigney, II ........... F16C 32/0438
310/90.5
5,355,042 A * 10/1994 Lewis .................. F16C 32/0444
310/68 B
(Continued)

FOREIGN PATENT DOCUMENTS

| KR | 10-1999-027969 A | 4/1999 |
| KR | 10-0749028 B1 | 8/2007 |
| KR | 10-2009-0041162 A | 4/2009 |

OTHER PUBLICATIONS

JP 2015218887; Matsuda Kenichi (Year: 2015).*
(Continued)

*Primary Examiner* — Ahmed Elnakib
(74) *Attorney, Agent, or Firm* — NSIP Law

(57) ABSTRACT

A turbomachine according to an embodiment of the present disclosure may include a rotary shaft, a magnetic bearing including a core body configured to surround the rotary shaft, a plurality of poles radially extending from an inner surface of the core body toward the rotary shaft, and coils wound around the plurality of poles to levitate the rotary shaft by using a magnetic force generated by a magnetic field formed by applied electric current, a sleeve journal bearing disposed between the rotary shaft and the magnetic bearing so as to surround the rotary shaft and configured to levitate the rotary shaft by generating a dynamic pressure when the rotary shaft rotates, and a permanent magnet disposed between the plurality of poles and configured to support the rotary shaft by using a magnetic force.

7 Claims, 8 Drawing Sheets

(58) Field of Classification Search
USPC .................................................. 310/90.5, 104
See application file for complete search history.

(56) References Cited

U.S. PATENT DOCUMENTS

| | | | | |
|---|---|---|---|---|
| 5,698,917 | A * | 12/1997 | Shultz | F16C 32/0465 |
| | | | | 310/90 |
| 7,683,514 | B2 * | 3/2010 | Onuma | F16C 32/0465 |
| | | | | 310/90.5 |
| 9,729,036 | B2 * | 8/2017 | Gieras | H02K 19/38 |
| 10,573,484 | B2 * | 2/2020 | Emaci | F16C 35/02 |
| 2007/0164626 | A1 * | 7/2007 | Taniguchi | F04D 29/05 |
| | | | | 310/90.5 |
| 2010/0247010 | A1 * | 9/2010 | Lee | F16C 32/048 |
| | | | | 384/114 |
| 2018/0238387 | A1 * | 8/2018 | Tangudu | F16C 32/0465 |

OTHER PUBLICATIONS

Ohsawa, M., et al. "High temperature blower for molten carbonate fuel cell supported by magnetic bearings." *Proc. 6th Internat. Symposium on Magnetic Bearings.* (1998). pp 32-41.

Yoo, S. Y., et al. "Active Magnetic Bearing System Design." *Proceedings of the Korean Society of Precision Engineering Conference.* Korean Society for Precision Engineering, (2011). pp. 417-422.

* cited by examiner

TURBOMACHINE HAVING HYBRID BEARING STRUCTURE INCLUDING MAGNETIC BEARING, PERMANENT MAGNET, AND SLEEVE JOURNAL BEARING AND METHOD OF CONTROLLING THE SAME

DESCRIPTION ABOUT NATIONAL RESEARCH AND DEVELOPMENT SUPPORT

This study was supported by the Development of next-generation high-efficiency energy material technology of Ministry of Science and ICT, Republic of Korea (Projects No. 1711173296) under the superintendence of Korea Institute of Science and Technology.

CROSS-REFERENCE TO RELATED APPLICATION

This application claims priority to Korean Patent Application No. 10-2022-0074059, filed on Jun. 17, 2022 and all the benefits accruing therefrom under 35 U.S.C. § 119, the contents of which in its entirety are herein incorporated by reference.

BACKGROUND

1. Technical Field

The present disclosure relates to a turbomachine having a hybrid bearing structure including a magnetic bearing, a permanent magnet, and a sleeve journal bearing and a method of controlling the same, and more particularly, to a turbomachine having a hybrid bearing structure including a magnetic bearing, a permanent magnet, and a sleeve journal bearing and a method of controlling the same that stably support a rotary shaft when the rotary shaft is used at an extremely low temperature and/or a high speed.

2. Related Art

In general, bearings for turbomachines are classified into an air foil bearing and a magnetic bearing. The air foil bearing levitates a rotary shaft by using a dynamic pressure of a fluid that is generated when the rotary shaft rotates. The magnetic bearing levitates a rotary shaft by using a magnetic force generated by a magnetic field.

A bearing is required to support the rotary shaft when the turbomachine is stopped. However, in a high-speed or cryogenic operational environment, the bearing may be easily damaged or the bearing hardly supports a high load (e.g., see Patent Document 1).

Meanwhile, when a ball bearing is used in a cryogenic turbomachine, the bearing is abraded because lubricity of a cryogenic fluid is very low. Therefore, a separate lubrication system may be required to solve the problem of abrasion of the bearing, which may reduce the overall efficiency of the turbomachine.

Therefore, recently, there has been a need for a bearing that may stably support a rotary shaft, when a turbomachine is suddenly stopped, without being easily damaged in a cryogenic or high-speed environment and may not be separately lubricated and cooled.

DOCUMENT OF RELATED ART

Patent Document (Patent Document 1) Korean Patent Application Publication No. 10-2009-0041162 (2009.04.28)

SUMMARY

The present disclosure has been made in an effort to provide a turbomachine capable of stably supporting a rotary shaft and having a simple structure.

To achieve the above-mentioned object, a turbomachine according to an embodiment of the present disclosure may include: a rotary shaft; a magnetic bearing including a core body configured to surround the rotary shaft, a plurality of poles radially extending from an inner surface of the core body toward the rotary shaft, and coils wound around the plurality of poles to levitate the rotary shaft by using a magnetic force generated by a magnetic field formed by applied electric current; a sleeve journal bearing disposed between the rotary shaft and the magnetic bearing so as to surround the rotary shaft and configured to levitate the rotary shaft by generating a dynamic pressure when the rotary shaft rotates, the sleeve journal bearing having magnetic permeability that is 1 or less so that a magnetic force line passing through one of the plurality of poles sequentially passes through the sleeve journal bearing, the rotary shaft, and another of the plurality of poles when the electric current is applied to the magnetic bearing; and a permanent magnet disposed between the plurality of poles and configured to support the rotary shaft by using a magnetic force.

The sleeve journal bearing may include at least one of austenite steel, platinum, tin, silver, and copper.

The sleeve journal bearing may be made of austenite steel.

An inner surface of the sleeve journal bearing may be coated with a solid lubricant to reduce friction or abrasion with the rotary shaft.

The solid lubricant may include polytetrafluoroethylene (PTFE), $MoS_2$, and graphite.

The turbomachine may further include a position sensor disposed at one side of the rotary shaft based on a radial direction and configured to sense a distance from the rotary shaft in the radial direction.

The turbomachine may further include a controller configured to control the amount of electric current to be applied to the magnetic bearing based on a distance between the rotary shaft and the position sensor in accordance with rotational vibration of the rotary shaft.

The controller may calculate additional electric current to be applied to the magnetic bearing based on the distance between the rotary shaft and the position sensor and the controller may apply the additional electric current to the magnetic bearing.

A method of controlling the turbomachine according to the embodiment of the present disclosure may include: sensing a load applied to the rotary shaft; applying supporting force generated by the permanent magnet and the sleeve journal bearing; determining whether the supporting force generated by the permanent magnet and the sleeve journal bearing is equal to or higher than the load applied to the rotary shaft; and applying electric current to the magnetic bearing based on a situation in which the supporting force generated by the permanent magnet and the sleeve journal bearing is lower than the load applied to the rotary shaft.

According to one aspect of the present disclosure, it is possible to provide the turbomachine capable of supporting the rotary shaft by using the fluid dynamic pressure and the magnetic force to stably support the rotary shaft when the rotary shaft is stopped in a cryogenic or high-temperature environment.

According to another aspect of the present disclosure, it is possible to provide the turbomachine capable of reducing electric power consumption by adjusting the electric current to be applied to the magnetic bearing based on the load applied to the rotary shaft.

DETAILED DESCRIPTION

Figure 1:
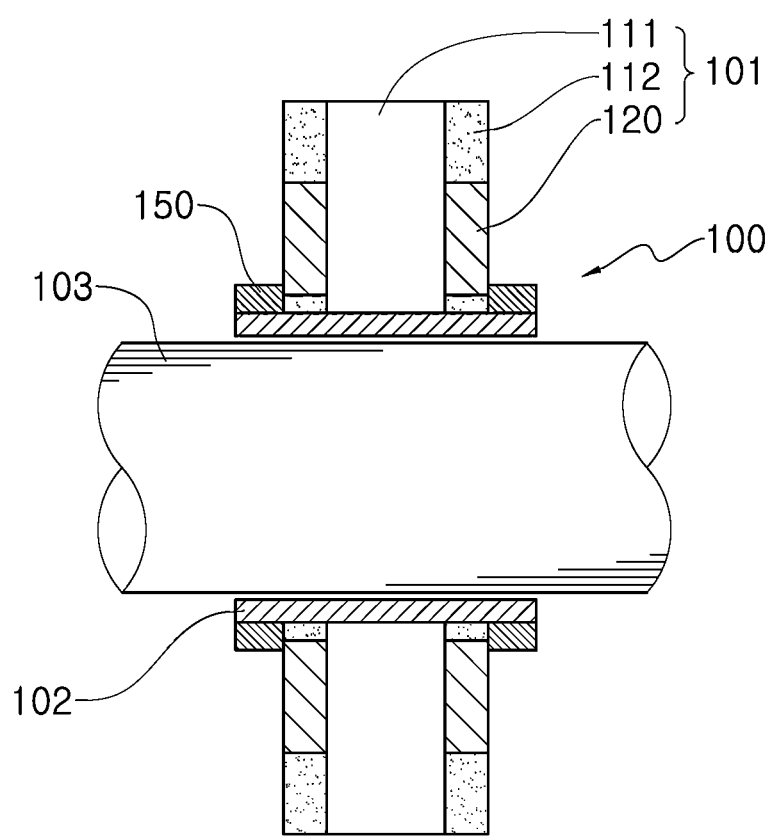
FIG. 1 is a cross-sectional view schematically illustrating a turbomachine according to an embodiment of the present disclosure.

Hereinafter, a turbomachine according to an embodiment of the present disclosure will be described with reference to exemplary embodiments of the present disclosure and the accompanying drawings.

Prior to the description, the constituent elements having the same configurations in the several embodiments will be assigned with the same reference numerals and described only in the representative embodiment, and only the constituent elements, which are different from the constituent elements according to the representative embodiment, will be described in other embodiments.

Figure 2:
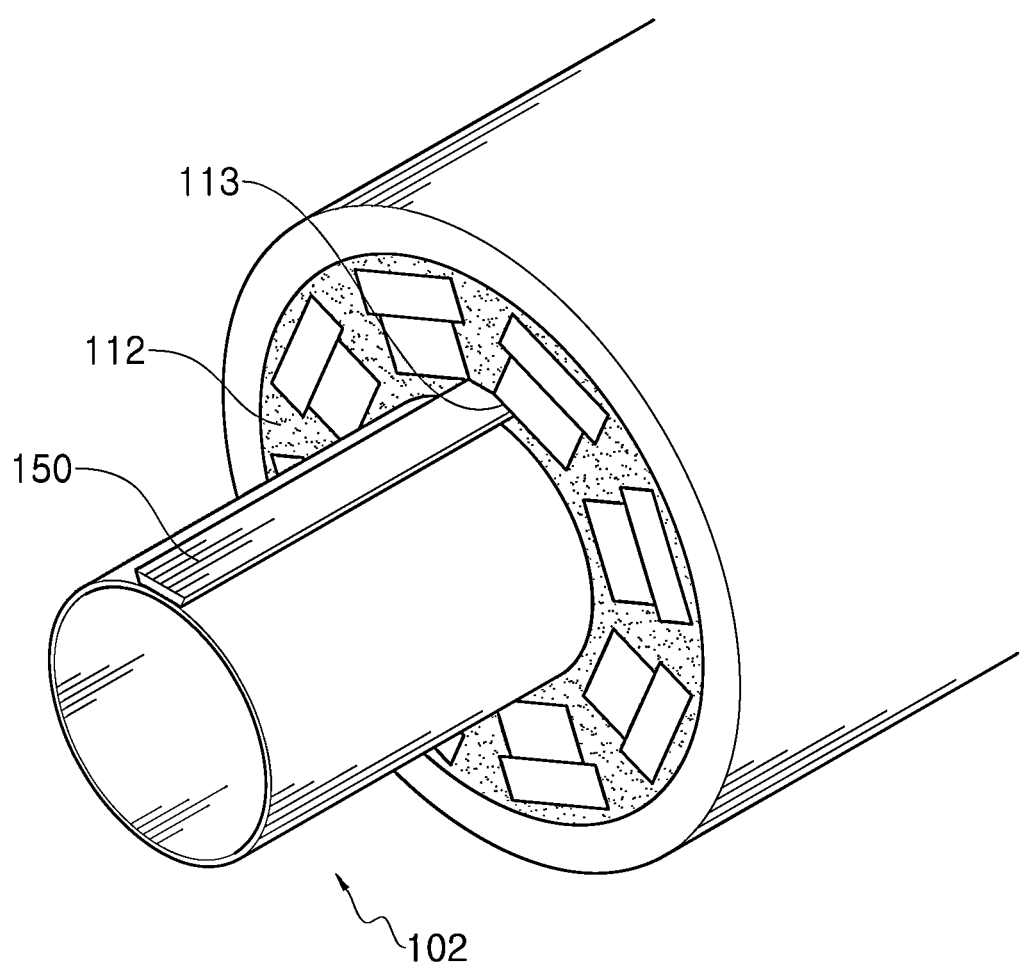
FIG. 2 is a perspective view illustrating a state in which a sleeve journal bearing and a magnetic bearing are coupled in the turbomachine according to the embodiment of the present disclosure.
Figure 3:
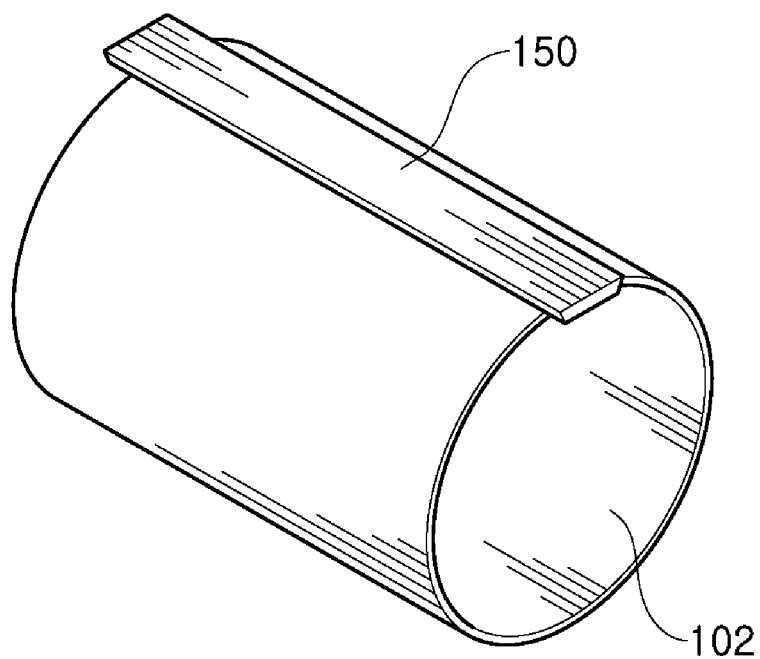
FIG. 3 is a perspective view illustrating the sleeve journal bearing of the turbomachine according to the embodiment of the present disclosure.

FIG. 1 is a cross-sectional view schematically illustrating a turbomachine according to an embodiment of the present disclosure. FIG. 2 is a perspective view illustrating a state in which a sleeve journal bearing and a magnetic bearing are coupled in the turbomachine according to the embodiment of the present disclosure. FIG. 3 is a perspective view illustrating the sleeve journal bearing of the turbomachine according to the embodiment of the present disclosure.

FIG. 1 is a cross-sectional view schematically illustrating the turbomachine according to an embodiment of the present disclosure. FIG. 2 is a perspective view illustrating a state in which a sleeve journal bearing 102 and a magnetic bearing 101 are coupled in the turbomachine according to the embodiment of the present disclosure. FIG. 3 is a perspective view illustrating the sleeve journal bearing 102 of the turbomachine according to the embodiment of the present disclosure.

Referring to FIGS. 1 to 3, a turbomachine 1 according to an embodiment of the present disclosure includes a rotary shaft 103 and a hybrid bearing 100. The hybrid bearing 100 supports and levitates the rotary shaft 103. The hybrid bearing 100 includes the magnetic bearing 101 and the sleeve journal bearing 102.

According to a relationship between the magnetic bearing 101 and the rotary shaft 103, the magnetic bearing 101 levitates and supports the rotary shaft 103 by using a magnetic force. The magnetic bearing 101 may adjust a magnetic force for levitating the rotary shaft 103 by adjusting the amount of electric current.

The magnetic bearing 101 includes: poles 111 extending toward the rotary shaft 103; coils 120 wound around the poles 111 to levitate the rotary shaft 103 by using the magnetic force generated by the magnetic field formed by the applied electric current; and dielectric materials 112 disposed between the poles 111 and the coils 120. The pole 111 is provided in plural, and the coil 120 corresponds to the pole 111.

According to a relationship between the sleeve journal bearing 102 and the rotary shaft 103, the sleeve journal bearing 102 levitates and supports the rotary shaft 103 by using a fluid dynamic pressure. A fluid may be disposed between the sleeve journal bearing 102 and the rotary shaft 103. The sleeve journal bearing 102 generates the dynamic pressure when the rotary shaft 103 rotates. The sleeve journal bearing 102 is disposed between the rotary shaft 103 and the magnetic bearing 101 and surrounds the rotary shaft 103.

The turbomachine 1 further includes a coupling piece 150 configured to couple the sleeve journal bearing 102 and the magnetic bearing 101. The coupling piece 150 may be coupled, welded, and/or attached to an outer portion of the sleeve journal bearing 102. The coupling piece 150 may be screw-coupled to the sleeve journal bearing 102. However, the method of coupling the sleeve journal bearing 102 and the coupling piece 150 is not limited to the example.

The magnetic bearing 101 includes a fixing groove 113. The fixing groove 113 is formed to correspond to the coupling piece 150.

One end of the sleeve journal bearing 102 may be coupled to the coupling piece 150, and the coupling piece 150 may be inserted into the fixing groove 113 in an axial direction. Therefore, the magnetic bearing 101 and the sleeve journal bearing 102 are easily coupled. That is, the sleeve journal bearing 102 is easily mounted and replaced. The sleeve journal bearing 102 is easily replaced when the sleeve journal bearing 102 is damaged and required to be replaced. The sleeve journal bearing 102 is easily replaced even though a thickness or material of the sleeve journal bearing 102 needs to be replaced in accordance with the situation.

Figure 4:
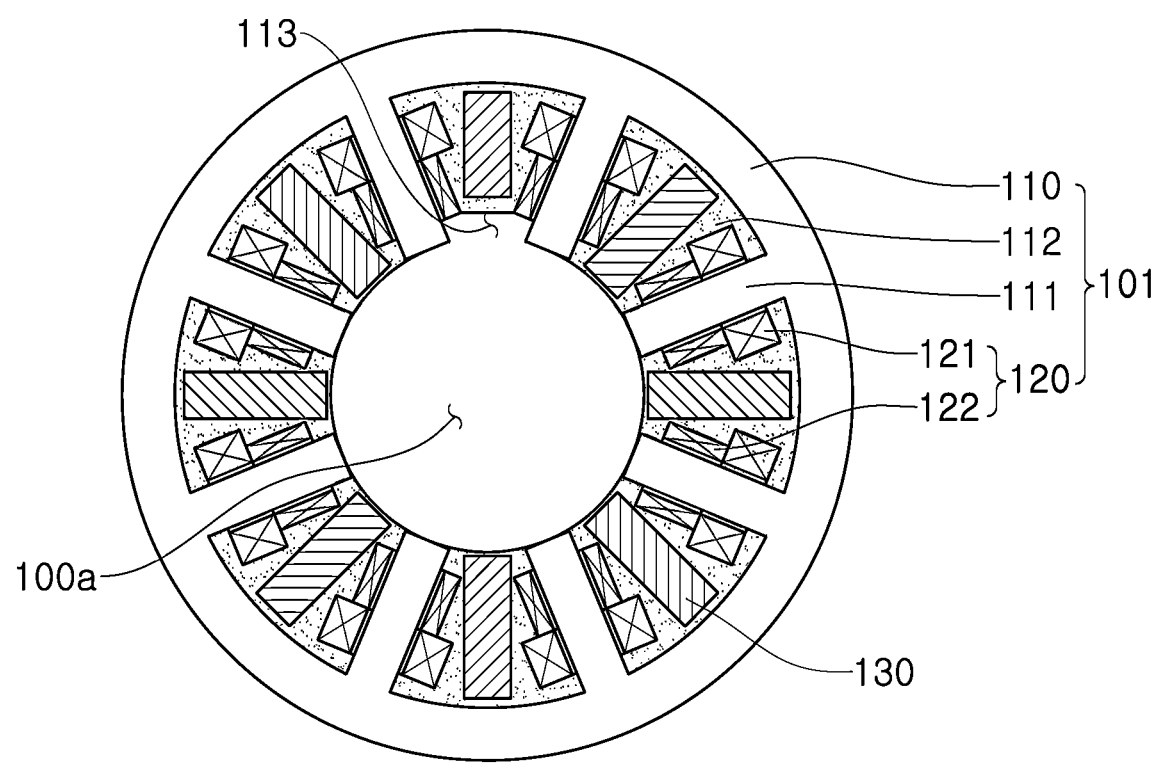
FIG. 4 is a cross-sectional view illustrating the magnetic bearing and a permanent magnet of the turbomachine according to the embodiment of the present disclosure.

FIG. 4 is a cross-sectional view illustrating the magnetic bearing 101 and the permanent magnet 130 of the turbomachine according to the embodiment of the present disclosure.

Referring to FIG. 4, the hybrid bearing 100 of the turbomachine 1 according to the embodiment of the present disclosure includes the magnetic bearing 101 and the sleeve journal bearing 102.

The magnetic bearing 101 include cores 110 and 111 and the coils 120. The cores 110 and 111 may surround the rotary shaft 103 and the sleeve journal bearing 102. The sleeve journal bearing 102 and the rotary shaft 103 are disposed in the cores 110 and 111. The cores 110 and 111 include a core body 110 configured to surround the rotary shaft, and the poles 111 extending radially from an inner surface of the core body 110 toward the rotary shaft 103.

The coils 120 are wound around the plurality of poles 111 to levitate the rotary shaft 103 by using the magnetic force generated by the magnetic field formed by the applied electric current.

When the electric current is applied to the magnetic bearing 101, the sleeve journal bearing 102 allows a magnetic force line, which passes through one of the plurality of poles 111, to flow to another of the plurality of poles 111 while sequentially passing through the sleeve journal bearing 102 and the rotary shaft 103.

Magnetic permeability of the sleeve journal bearing 102 may be 1 or less so that the magnetic force may smoothly pass through the magnetic bearing 101 and the rotary shaft 103. For example, the sleeve journal bearing 102 includes at least one of austenite steel, Inconel, nickel-chromium alloy, platinum, tin, silver, and copper. The sleeve journal bearing 102 may be made of a material having no magnetism.

For example, the sleeve journal bearing 102 may be made of austenite-based steel. In this case, the austenite-based steel may be stainless having no magnetism. However, the material of the sleeve journal bearing 102 is not limited to the example.

The hybrid bearing 100 according to the embodiment of the present disclosure includes the permanent magnet 130. The permanent magnet 130 is disposed between the plurality of poles 111 and support the rotary shaft 103 by using the magnetic force. In addition, it can be seen that the permanent magnet 130 is disposed between the coils 120. The permanent magnet 130 may be provided in plural. The permanent magnet 130 will be described below in detail.

The fixing groove 113 has a shape that is narrowed toward a center of the housing 110. Likewise, the coupling piece 150 also has a shape that is narrowed toward the center, such that the coupling piece 150 is not separated in a circumferential direction. Therefore, the sleeve journal bearing 102 is coupled to the magnetic bearing 101 by using the coupling piece 150 without being coupled by the housing 110, such that an overall volume of the coupled bearing in an axial direction is remarkably reduced.

Because an interval between the adjacent poles 111 decreases toward the center of the housing 110, first and second parts 121 and 122 of the coil 120 are different in winding density.

An insertion portion is formed in a central portion of the magnetic bearing 101, and the rotary shaft 103 and/or the sleeve journal bearing 102 may be introduced into the insertion portion. The insertion portion may be formed to correspond to shapes of the rotary shaft 103 and the sleeve journal bearing 102.

Figure 5:
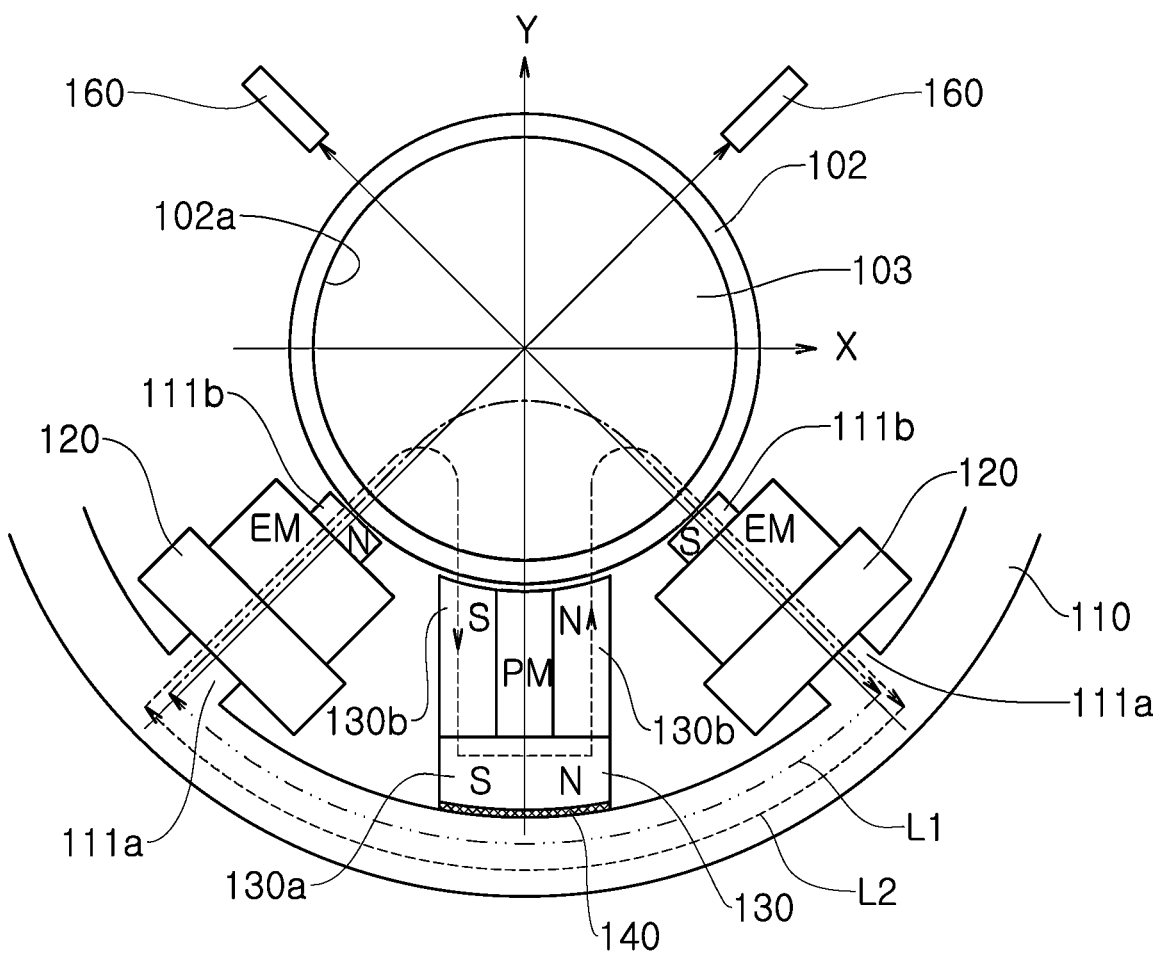
FIG. 5 is a schematic view illustrating a state in which the magnetic bearing and the permanent magnet, which are illustrated in FIG. 4, interact with a rotary shaft.

FIG. 5 is a schematic view illustrating a state in which the magnetic bearing 101 and the permanent magnet 130, which are illustrated in FIG. 4, interact with the rotary shaft 103.

Referring to FIG. 5, the turbomachine 1 according to the embodiment of the present disclosure further includes the permanent magnet 130, shield members 140, and position sensors 160. According to a relationship between the permanent magnet 130 and the rotary shaft 103, the permanent magnet 130 may levitate and support the rotary shaft 103 by using the magnetic force. The permanent magnet 130 may be disposed between the plurality of poles 111. In the drawing, only the single permanent magnet 130 is illustrated, but the present disclosure is not limited thereto. The plurality of permanent magnets 130 may be provided between the plurality of poles 111 (see FIG. 4). The shield member 140 may be disposed between the permanent magnets 130 and the housing 110.

The interactions between the rotary shaft 103, the sleeve journal bearing 102, the magnetic bearing 101, and the permanent magnets 130 will be described. FIG. 5 indicates the magnetic force applied to the pole 111, the sleeve journal bearing 102, the rotary shaft 103, and the permanent magnets 130 as magnetic force lines L1 and L2.

First, when the electric current is applied to the magnetic bearing 101, the magnetic force lines L1 and L2 are formed from an outer side 111*a* of the pole to an inner side 111*b* of the pole. The magnetic force lines L1 and L2 may be provided in plural. The plurality of magnetic force lines L1 and L2 may include a first magnetic force line L1 and a second magnetic force line L2.

The first magnetic force line L1 is formed while passing through an N-pole of the inner side 111*b* of the pole disposed at a −X side in a radial direction of the rotary shaft 103, sequentially passing through the sleeve journal bearing 102 and the rotary shaft 103, passing through the sleeve journal bearing 102, and then passing through an S-pole of the pole inner side 111*b* disposed at a +X side. Further, the first magnetic force line L1 passes through an N-pole of the outer side 111*a* of the pole and the housing 110 and is formed toward the pole 111 disposed at the −X side. However, the direction in which the magnetic force line is formed is not limited to the configuration illustrated in the drawing.

The second magnetic force line L2 sequentially passes through the N-pole of the inner side 111*b* of the pole disposed at the −X side, the sleeve journal bearing 102, and the rotary shaft 103 and is formed toward the permanent magnets 130. Further, the second magnetic force line L2 is formed by passing through the outer side 130*a* from the inner side 130*b* of the permanent magnet 130, passing through the sleeve journal bearing 102 and the rotary shaft 103 through the opposite inner side 130*b*, and then passing through the S-pole of the inner side 111*b* of the pole disposed at the +X side. Further, the second magnetic force line L2 passes through the housing 110 and is formed toward the pole 111 disposed at the −X side. However, the direction in which the magnetic force line is formed is not limited to the configuration illustrated in the drawing.

Because the rotary shaft 103 interacts with the sleeve journal bearing 102, the magnetic bearing 101, and the permanent magnets 130 by using the magnetic force, the rotary shaft 103 may be supported. In this case, according to a relationship between the sleeve journal bearing 102 and the rotary shaft 103, the sleeve journal bearing 102 may support the rotary shaft 103 by using the fluid dynamic pressure. When the electric current is applied, the magnetic bearing 101 may support the rotary shaft 103 by using the magnetic force generated based on the relationship between the magnetic bearing 101 and the rotary shaft 103. In addition, the permanent magnets 130 may also support the rotary shaft 103 by using the magnetic force by interacting with the rotary shaft 103. Because the rotary shaft is supported by the permanent magnets 130, it is possible to stably support the rotary shaft 103 even though a small amount of electric current is applied to the magnetic bearing 101. Furthermore, because the rotary shaft is supported by the magnetic force and the dynamic pressure made by the sleeve journal bearing, it is possible to reduce the electric current to be additionally applied.

In this case, the sleeve journal bearing 102 is made of a material excellent in magnetic permeability so that the magnetic force line smoothly passes through the sleeve journal bearing 102. The sleeve journal bearing 102 is made of a material having magnetic permeability of 1 or less. For example, the sleeve journal bearing 102 includes at least one of austenite steel, neodymium, platinum, tin, silver, and copper. For example, the sleeve journal bearing 102 is made of austenite-based steel.

In addition, an inner surface 102a of the sleeve journal bearing 102 is coated with a solid lubricant to reduce friction and/or abrasion between the sleeve journal bearing 102 and the rotary shaft 103. The solid lubricant includes polytetrafluoroethylene (PTFE), $MoS_2$, and graphite.

Figure 6:
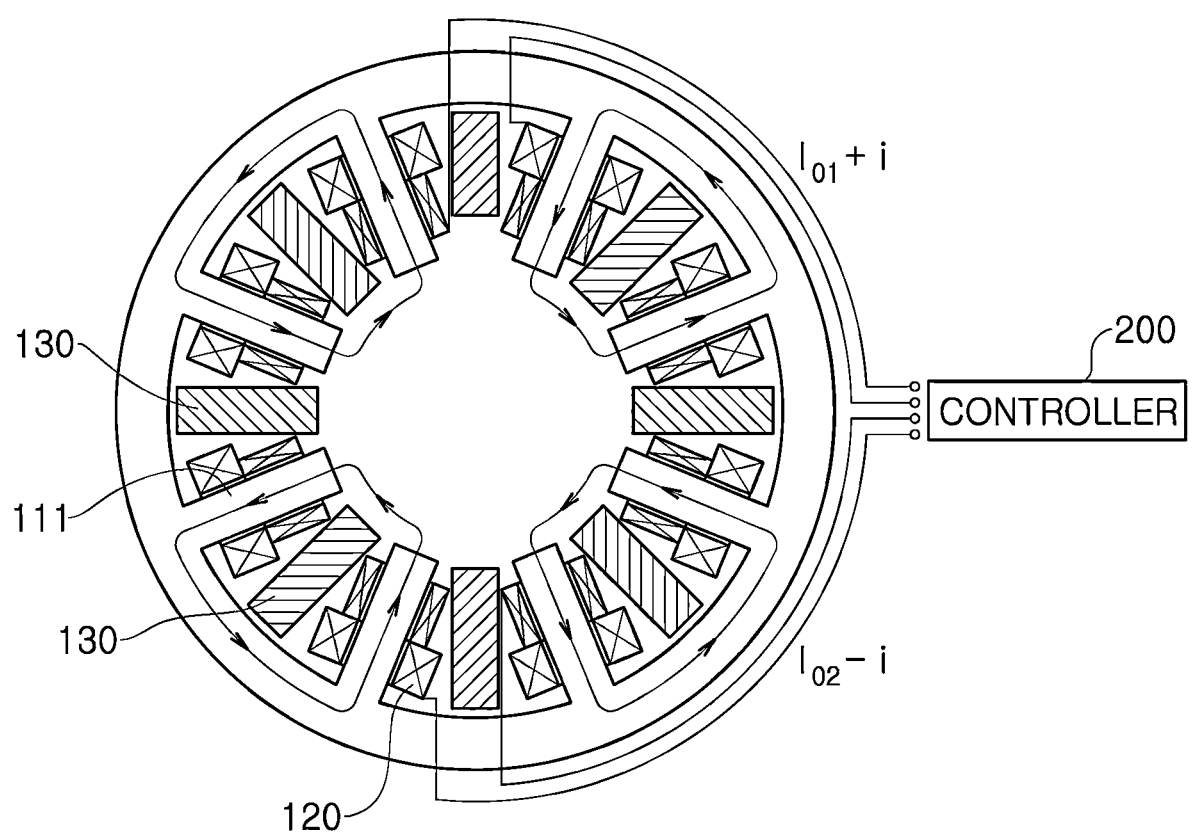
FIG. 6 is a conceptual view schematically illustrating a magnetic field formed as electric current is applied to the magnetic bearing in FIG. 5.

FIG. 6 is a conceptual view schematically illustrating a magnetic field formed as electric current is applied to the magnetic bearing 101 in FIG. 5.

Referring to FIG. 6, according to the embodiment of the present disclosure, the number of poles 111 is not limited. However, for description, eight poles 111 are illustrated as being horizontally symmetric. The directions of the magnetic fields made by the coils 120 wound around the two adjacent poles 111 are identical to each other, and the directions of the magnetic fields made by the coils 120 wound around the two poles 111 adjacent to the above-mentioned poles are opposite to each other. When the electric current is applied, four circulating magnetic fields are formed at the periphery of the rotary shaft 103. Because the rotary shaft 103 has a weight, a larger amount of magnetic force generated by the magnetic field needs to be applied to an upper side of the rotary shaft 103. Therefore, electric current of (I01+i) made by adding control electric current (i) to bias electric current (I01) is applied to the coil 120 that forms the magnetic field at the upper side, and electric current of (I02-i) made by subtracting the control electric current (i) from the bias electric current (I02) is applied to the coil 120 at the lower side.

Figure 7:
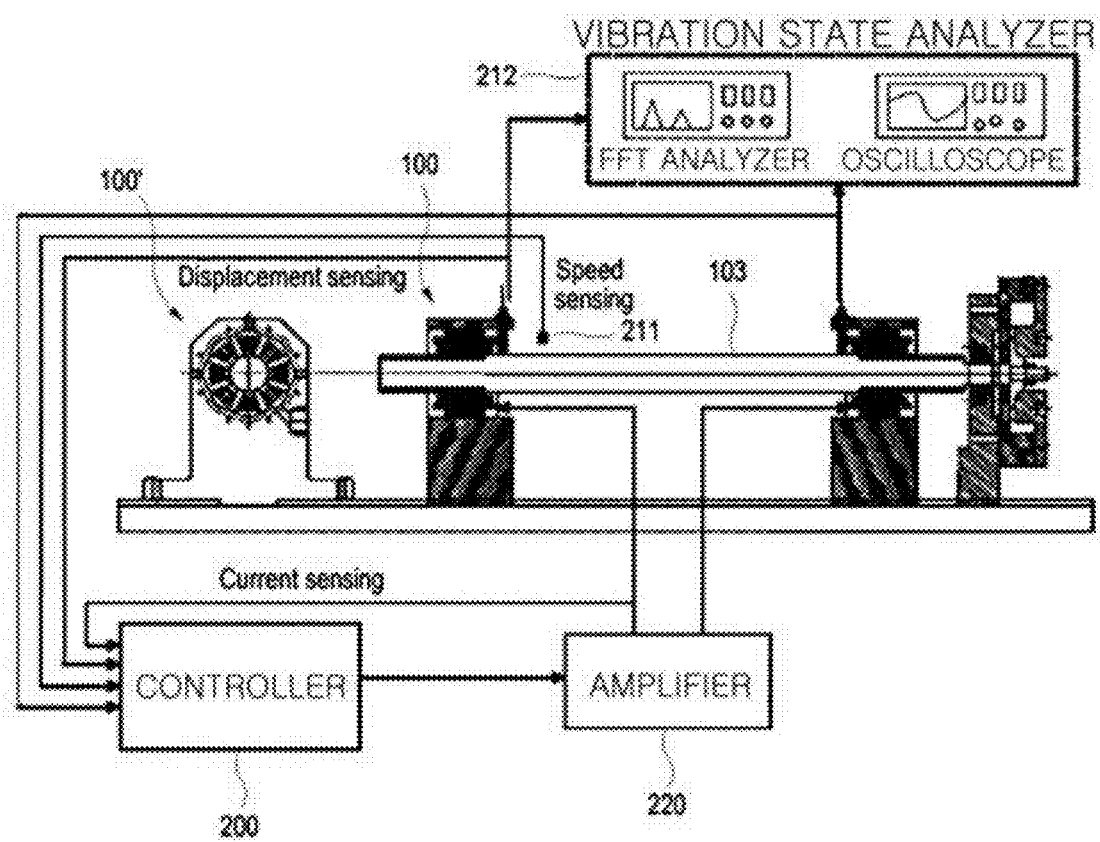
FIG. 7 is a conceptual view illustrating a system for controlling an operation of the magnetic bearing according to the present disclosure.

FIG. 7 is a conceptual view illustrating a system for controlling an operation of the magnetic bearing 101 according to the present disclosure.

Referring to FIG. 7, the system for controlling the magnetic bearing 101 according to the embodiment of the present disclosure includes: a sensor 211 configured to detect a speed of the rotary shaft 103; a vibration state analyzer 212 in the bearing 100 and configured to detect a change in position of the center of the rotary shaft 103; a controller 200 configured to control the electric current applied to the magnetic bearing 101 based on the speed of the rotary shaft 103 and the position of the rotary shaft 103; and an amplifier 220 configured to amplify the electric current to be applied to the magnetic bearing 101. The controller 200 adjusts the intensity of the electric current to be applied to the magnetic bearing 101 by controlling the amplifier 220. In addition, the electric current applied to the magnetic bearing from the amplifier 220 is continuously detected. The vibration state analyzer 212 may be an FFT analyzer or an oscilloscope that detects an amplitude of the rotary shaft 103 of a bearing 100' when viewed from the front side. In addition, the vibration state analyzer 212 may include the position sensor 160 (see FIG. 5). The position sensor 160 may sense a gap from the rotary shaft 103. The position sensor 160 may be disposed at one side of the rotary shaft 103 based on the radial direction and sense a distance from the rotary shaft 103 in the radial direction.

The controller 200 controls the amount of electric current to be applied to the magnetic bearing 101 based on a distance between the rotary shaft 103 and the position sensor 160 according to the rotational vibration of the rotary shaft 103. For example, when the rotational vibration exceeds a predetermined vibration range as a rotational speed of the rotary shaft 103 exceeds a critical speed, the controller 200 may increase the magnetic force generated in the magnetic bearing 101 by applying a large amount of electric current to the magnetic bearing 101, thereby reducing vibration of the rotary shaft 103. On the contrary, when the rotational vibration of the rotary shaft 103 is small, the controller 200 may eliminate or decrease the magnetic force generated in the magnetic bearing 101 by applying no electric current or a small amount of electric current to the magnetic bearing 101, thereby saving electric power.

Figure 8:
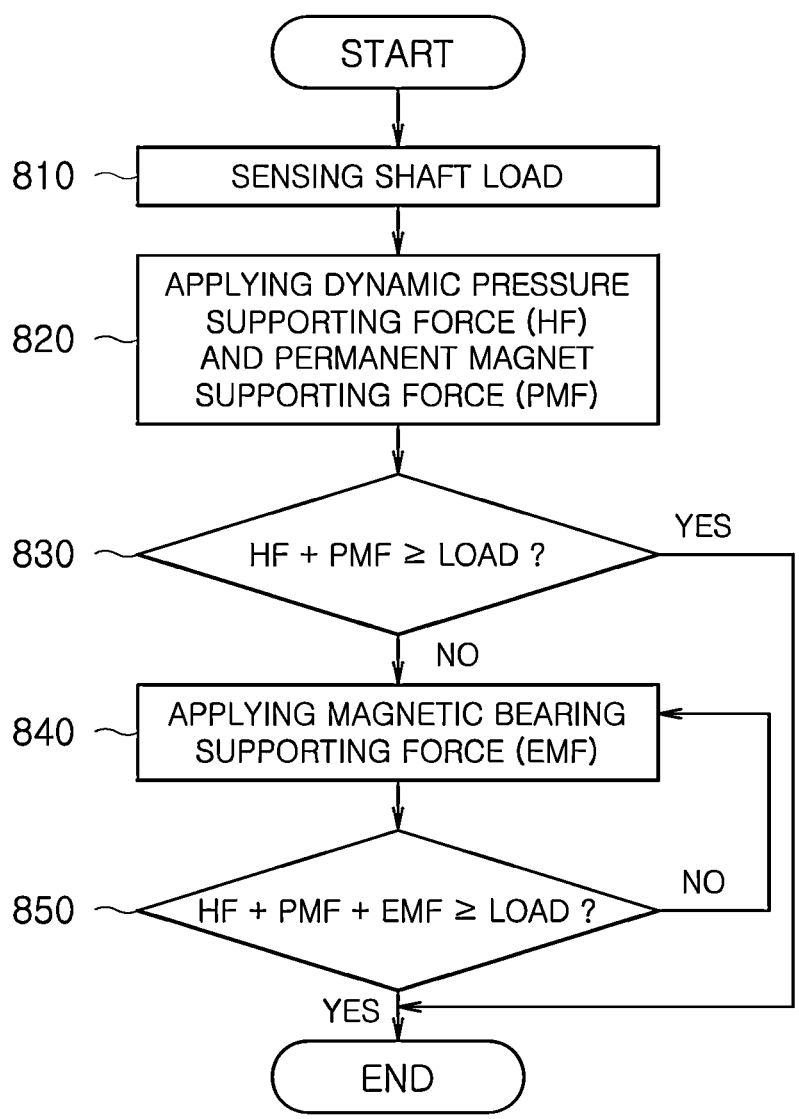
FIG. 8 is a flowchart illustrating a process in which the system in FIG. 7 controls the magnetic bearing.

FIG. 8 is a flowchart illustrating a process in which the system in FIG. 7 controls the magnetic bearing 101.

Referring to FIG. 8, a method of controlling a supporting force for the rotary shaft 103 based on a load applied to the rotary shaft 103 by the turbomachine 1 according to the embodiment of the present disclosure will be described. The following control method may be performed by the controller 200.

The turbomachine 1 according to the embodiment of the present disclosure includes step 810 of sensing a load applied to the rotary shaft 103. The position sensor 160 senses and/or measures a distance between the rotary shaft 103 and the sensor, and the turbomachine may sense and/or measure a load applied to the rotary shaft 103 based on the distance between the rotary shaft 103 and the sensor.

The method of controlling the turbomachine 1 includes step 820 of applying a dynamic pressure supporting force HF, which is generated by the sleeve journal bearing 102, and a magnetic supporting force PMF, which is generated by the permanent magnets 130, to the rotary shaft 103 to support the rotary shaft 103 that receives the load. As described above, according to the relationship between the permanent magnets 130 and the rotary shaft 103, the permanent magnets 130 may levitate the rotary shaft 103 by using the magnetic force.

The method of controlling the turbomachine 1 includes step 830 of determining whether the supporting force generated by the permanent magnets 130 and the sleeve journal bearing 102 is equal to or higher than a force or load applied to the rotary shaft 103. In this case, when the supporting force generated by the permanent magnets 130 and the sleeve journal bearing 102 is higher than the load, the control is ended. In contrast, when the supporting force generated by the permanent magnets 130 and the sleeve journal bearing 102 is lower than the load, the following step is performed.

The method of controlling the turbomachine 1 includes step 840 of applying the electric current to the magnetic bearing 101 to support the rotary shaft 103 based on the situation in which the supporting force generated by the permanent magnets 130 and the sleeve journal bearing 102 is lower than the load applied to the rotary shaft 103. As the electric current flows through the magnetic bearing 101, the magnetic field is generated between the magnetic bearing 101 and the rotary shaft 103, and the rotary shaft 103 may be levitated and supported.

The method of controlling the turbomachine 1 includes step 850 of determining whether the supporting forces, which are generated by the permanent magnets 130 and the sleeve journal bearing 102, and the supporting force, which is generated by the magnetic bearing 101, are equal to or higher than a force or load applied to the rotary shaft 103. In this case, a control variable is maintained when the supporting force is higher than the load. The term "END" illustrated in FIG. 8 means that the control variable is maintained. In contrast, when the supporting force is lower than the load, the intensity of the electric current flowing through the magnetic bearing 101 is increased, and the supporting force generated by the magnetic field is increased, such that the rotary shaft 103 is supported.

The above-mentioned control method may stably reduce the vibration of the rotary shaft 103 in the turbomachine 1 that operates at a high speed. In addition, according to the turbomachine 1 according to the embodiment of the present disclosure, the rotary shaft 103 is supported by the dynamic pressure generated by the sleeve journal bearing 102 and magnetically supported by the permanent magnets 130, and the rotary shaft 103 is supported by the magnetic force by using the magnetic bearing 101. Therefore, the initial bias electric current need not be applied, or a very small amount of electric current may be applied. Therefore, the energy efficiency of the turbomachine 1 may be increased, and the rotary shaft may be supported by actively controlling the electromagnetic force.

A person skilled in the art may understand that the present disclosure may be carried out in other specific forms with reference to the above-mentioned descriptions without changing the technical spirit or the essential characteristics of the present disclosure.

For example, the hybrid bearing structure may be applied not only to a journal bearing but also to a thrust bearing.

Accordingly, it should be understood that the aforementioned embodiments are described for illustration in all aspects and are not limited, and the scope of the present disclosure shall be represented by the claims to be described below, and it should be construed that all of the changes or modified forms derived from the meaning and the scope of the claims, and an equivalent concept thereto are included in the scope of the present disclosure.

DESCRIPTION OF REFERENCE NUMERALS

100: Hybrid bearing
100a: Insertion portion
101: Magnetic bearing
110: Core body
111: Pole
112: Dielectric material
113: Fixing groove
120: Coil
102: Sleeve journal bearing
102a: Inner surface of sleeve journal bearing
103: Rotary shaft
130: Permanent magnet
140: Shield member
150: Coupling piece
160: Position sensor
L1: First magnetic force line
L2: Second magnetic force line

What is claimed is:

1. A turbomachine comprising:
    a rotary shaft;
    a magnetic bearing comprising a core body configured to surround the rotary shaft, a plurality of poles radially extending from an inner surface of the core body toward the rotary shaft, and coils wound around the plurality of poles to levitate the rotary shaft by using a magnetic force generated by a magnetic field formed by applied electric current;
    a sleeve journal bearing disposed between the rotary shaft and the magnetic bearing to surround the rotary shaft and configured to levitate the rotary shaft by generating a dynamic pressure when the rotary shaft rotates; and
    a permanent magnet disposed between the plurality of poles and configured to support the rotary shaft by using a magnetic force,
    wherein the sleeve journal bearing is made of austenite steel.

2. The turbomachine of claim 1, wherein an inner surface of the sleeve journal bearing is coated with a solid lubricant to reduce friction or abrasion with the rotary shaft.

3. The turbomachine of claim 2, wherein the solid lubricant includes at least one of polytetrafluoroethylene (PTFE), $MoS_2$, and graphite.

4. The turbomachine of claim 1, further comprising:
    a position sensor disposed at one side of the rotary shaft based on a radial direction and configured to sense a distance from the rotary shaft in the radial direction.

5. The turbomachine of claim 4, further comprising:
    a controller configured to control the amount of electric current to be applied to the magnetic bearing based on a distance between the rotary shaft and the position sensor in accordance with rotational vibration of the rotary shaft.

6. The turbomachine of claim 5,
    wherein the controller calculates additional electric current to be applied to the magnetic bearing based on the distance between the rotary shaft and the position sensor and
    the controller applies the additional electric current to the magnetic bearing.

7. A method of controlling the turbomachine according to claim 1, the method comprising:
    sensing a load applied to the rotary shaft;
    applying supporting force generated by the permanent magnet and the sleeve journal bearing;
    determining whether the supporting force generated by the permanent magnet and the sleeve journal bearing is equal to or higher than the load applied to the rotary shaft; and
    applying electric current to the magnetic bearing based on a situation in which the supporting force generated by the permanent magnet and the sleeve journal bearing is lower than the load applied to the rotary shaft.

* * * * *